United States Patent [19]

Webb

[11] 4,116,822
[45] Sep. 26, 1978

[54] METHOD OF SELECTIVELY SEPARATING GLASS FROM WASTE MATERIAL

[75] Inventor: Clyde B. Webb, Jacksonville, Fla.

[73] Assignee: Carpco, Inc., Jacksonville, Fla.

[21] Appl. No.: 701,203

[22] Filed: Jun. 30, 1976

Related U.S. Application Data

[63] Continuation of Ser. No. 476,296, Jun. 4, 1974, abandoned.

[51] Int. Cl.$^2$ .............................................. B03B 1/02
[52] U.S. Cl. ........................................ 209/11; 209/12; 209/127 R
[58] Field of Search .............................. 209/127–131, 209/9, 12, 3, 11; 241/20, 24

[56] References Cited

U.S. PATENT DOCUMENTS

| | | | |
|---|---|---|---|
| 859,998 | 7/1907 | Wentworth | 209/127 R |
| 2,314,940 | 3/1943 | Hewitt | 209/127 R |
| 2,445,229 | 7/1948 | Musse | 209/127 R |
| 2,765,074 | 10/1956 | Diamond | 209/127 A X |
| 2,805,769 | 9/1957 | Lawver | 209/127 A X |
| 3,031,079 | 4/1962 | Boss | 209/128 |
| 3,063,561 | 11/1962 | Snow | 209/127 R X |
| 3,217,876 | 11/1965 | Rutenrieth | 209/127 R X |
| 3,322,275 | 5/1967 | Breakiron | 209/127 R |
| 3,897,330 | 7/1975 | Rhys | 209/128 X |
| 3,941,684 | 3/1976 | Bradbury | 209/3 |
| 3,970,546 | 7/1976 | Webb et al. | 209/12 X |

FOREIGN PATENT DOCUMENTS 1,924,640  11/1970  Fed. Rep. of Germany .......... 209/129

OTHER PUBLICATIONS

Proc. Third Mineral Waste Util. Symposium, Mar. 1972, Morey et al., p. 313.

*Primary Examiner*—Robert Halper
*Attorney, Agent, or Firm*—Schuyler, Birch, Swindler, McKie & Beckett

[57] ABSTRACT

Separation of glass from waste material by high tension techniques. The waste is sized to a range from 1/8 to 1 1/2 inches, dried to a moisture content less than 2%, air classified to remove low bulk density material, and subjected to magnetic separation to remove ferrous metal. The waste is then fed to the top of a rotating grounded drum and subjected successively to ion bombardment from corona discharge electrodes and to an electrostatic field from a static electrode. The glass remains pinned to the roll while other materials come off in the static field.

16 Claims, 3 Drawing Figures

METHOD OF SELECTIVELY SEPARATING GLASS FROM WASTE MATERIAL

This is a continuation of co-pending application Ser. No. 476,296 filed June 4, 1974, now abandoned.

BACKGROUND OF THE INVENTION

It has become apparent that the earth's natural resources are not unlimited and that mankind's ultimate survival depends on proper conservation of those resources, both by controlling the depletion of raw materials and by eliminating pollution of our land, water and atmosphere. At the same time the world-wide desired for an ever increasing standard of living provides great pressure for rapid production and consumption of goods at the lowest possible immediate cost. Faced with resolving these conflicting demands, planners are increasingly turning to the concept of recycling to provide efficient utilization of raw materials, reduce the output of pollutants and maintain an acceptable supply of goods for our economy.

One material which is a prime candidate for recycling is glass. The non-biodegradable character of glass makes discarded glass a particularly obnoxious pollutant because of its permanency. Glass also is readily subjected to remelting and reforming for reuse.

The principal obstacle in recycling glass is the difficulty of separating glass from other waste materials. The usual route of discarded glass is through municipal waste systems which yield a thoroughly co-mingled mixture of materials of staggering diversity.

Electrostatic separation has been practiced for years primarily in treatment of grains and mineral ores. Actually the use of the term "electrostatic" is a misnomer because most so-called electrostatic separators leak an appreciable current between electrodes and thus are dynamic instead of static in operation. Grains are small and uniform in size. Efficient operation generally required reduction of the ore particles to small size because only very narrow size ranges of low mass particles could be effectively separated. It has been generally thought that high tension separation methods were effective only when the particle sizes of the material being separated were less than about ⅛ inch. Although mineral ores are not usually considered truly homogeneous mixtures, they are much more homogeneous than municipal waste, which incorporates the most diverse types of materials conceivable. Muncipal waste is probably the most heterogeneous mixture known. The very heterogeneous nature of municipal waste coupled with its comparatively low economic value have made it impractical to reduce the waste to particle sizes of the magnitude thought necessary for efficient high tension separation. Thus prior efforts to apply high tension separation techniques to the treatment of municipal waste have not been successful.

I have discovered that the combination of particular electrode configuration and arrangement with special preparation of the municipal waste unexpectedly results in highly efficient separation of glass particles from municipal waste at size ranges well above those previously considered practicable for high tension separation.

It is an object of this invention to provide a method for separating glass particles from municipal waste by high tension means.

It is a further object of this invention to provide a method of the aforesaid character which will efficiently separate particles of larger size than previously processed by high tension methods.

It is an additional object of this invention to provide a method for separating glass from waste material which cn be conveniently added onto existing waste processing treatment facilities with little or no modification to the rest of the ongoing process.

It is also an object of this application to provide a process which will produce a metal free glass cullet product suitable for recycling.

Further objects of the invention will be apparent from a consideration of the specification.

SUMMARY OF THE INVENTION

I have found that by reducing municipal waste material to a particle size less than 1½ inches, preferably less than 1¼ inches; reducing the moisture content of the waste material to less than 2%; and by treating the particulate waste in a high tension separator wherein in a first zone the waste material is subjected to ion bombardment from at least one ionizing electrode, and in a second zone the particulate material is thereafter subjected to an electrostatic field from a non-ionizing electrode, glass particles and particles of non-glass materials may be collected as separate fractions. Further refinements of the invention involve subjecting the feed material to air classification to remove fine particles and low density materials; subjecting the feed material to magnetic separation to remove ferrous metal constituents as a separate fraction; and second stage treatment of the collected fractions to achieve further separation.

BRIEF DESCRIPTION OF THE DRAWINGS

Preferred embodiments of the invention will now be described with reference to the accompanying drawings wherein.

DETAILED DESCRIPTION OF THE PREFERRED EMBODIMENTS

Figure 1:
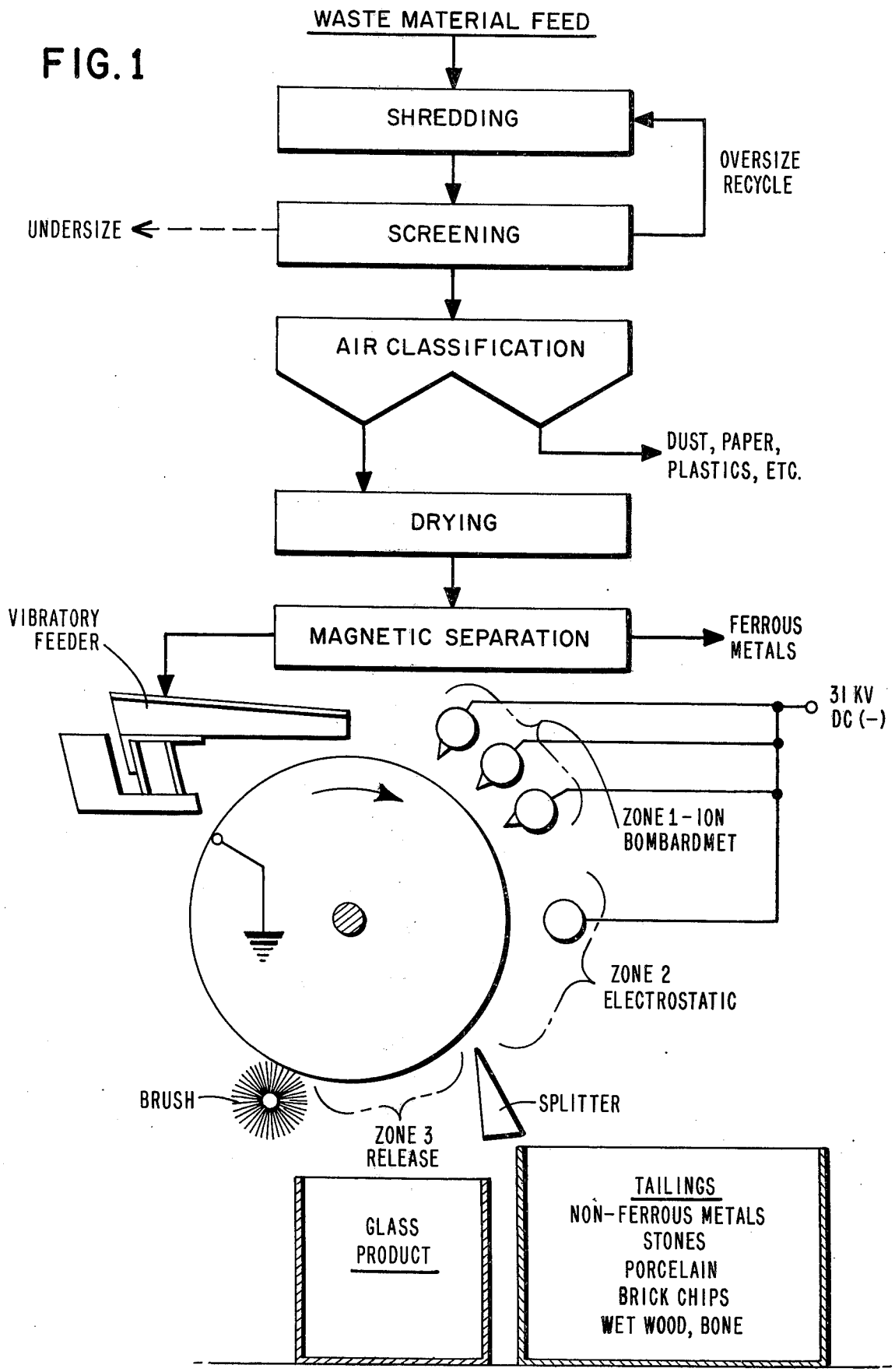
FIG. 1 is a schematic representation of the preferred process.

FIG. 1 is a schematic representation of a preferred scheme for carrying out the process of the invention. The waste material feed appropriately comprises refuse material exactly as it is delivered to the treatment plant by the collection trucks. The incoming material is subjected to a sizing operation, such as a combination of screening and shredding by conventional means, e.g., a hammer mill, to achieve a particle size of less than 1½ inches. Size reduction may be effected either by conventional shredding (dry) techniques or by pulping (wet) techniques. By a particle size of less than 1½ inches, it is meant a particle which will pass through a 1½ inch mesh screen. Oversize particles are preferably returned to the shredding operation. If desired an underize fraction of extremely fine material may be removed during the screening process.

The sized material is then preferably forwarded to a classification step wherein extremely fine material and low density material such as paper, lightweight plastics and the like are removed. The classification may be effected by either dry or wet techniques, but because of the necessity for subsequent drying of the feed material prior to the electrostatic separation step described hereinafter, it is preferred to use dry procedures such as air classification. A cyclone separator can also be used for classification of the material.

The material is then forwarded to a drying step wherein the moisture content of the feed material is reduced to 2% or less. Satisfactory drying may be obtained by use of a rotaty tumbling dryer. The dryer may be carried out prior to the air classification step if the content of wet, low density material in the waste material feed is quite high. Ordinarily classification is carried out first to reduce the amount of material which must be processed through the dryer.

In the preferred operation the feed material is subjected to a magnetic separation step to remove ferrous metal particles. The economic value of scrap iron and steel makes it advantageous to separate ferrous metals as a separate fraction. If the incidence of heavy ferrous metal articles in the refuse material is large, it may be preferable to carry out the magnetic separation step prior to the initial sizing to facilitate shredding and screening. Such a modification of the process is considered to be within the scope of the invention.

After sizing and drying and the optional classification and magnetic separation steps, the waste material is passed to a vibratory feeder from which it cascades down onto a rotating metal drum. The drum is electrically conductive and is connected to ground so as to constitute a rotatable electrode. The waste material may be fed by the vibratory feeder to the rotating drum at a rate in the range from about 50 to 150 pounds per hour per linear inch of roll, preferably in the range from about 80 to 110 pounds per hour per inch. Preferably, the drum has a diameter in the range from 14 to 36 inches. Drums having diameters as small as 6 inches may be used although efficiency may be somewhat less due to the small size of the treatment zones. Drums greater than 36 inches in diameter are efficient, but require large and bulky apparatus and somewhat lessen convenience in the processing installation. The speed of rotation of the electrode may range from 8 to 25 revolutions per minute or higher; the preferred range being from 10 to 18 revolutions per minute. The roll size and speed must be correlated to avoid excessive centrifugal force which acts to throw material of the roll. At large drum diameters and relatively high rates of rotation, the centrifugal force acting on the waste material particles may make it difficult to effectively pin the glass to the roll surface.

As the waste material falls onto the top of the rotating electrode, it enters a first treatment zone where it is subjected to ion bombardment from at least one ionizing electrode. The D.C. voltage applied to the ionizing electrodes should lie in the range from 20 kilovolts to 40 kilovolts, preferably from 25 to 35 kilovolts. Three electrodes are shown in the preferred embodiment. Either positive or negative polarity electrodes can be utilized in the process of the invention. FIG. 1 of the drawings illustrates negatively charged electrodes. To simplify the subsequent discussion, the use of electrodes connected to a source of negative D.C. potential will be described. The operation of the process with positive electrodes is the same except for reversal of the polarity.

Suitable ionizing electrodes are corona discharge electrodes such as those disclosed by Carpenter in his U.S. Pat. No. 2,548,771. These electrodes are sometimes referred to as beam electrodes or focusing electrodes. The Carpenter electrodes comprise a small diameter wire and a relatively large diameter tube or rod parallel to each other. Both the wire and the tube are charged with high voltage direct current. Since corona discharge preferentially take place from sharp corners or tightly curved surfaces, discharge from the electrodes takes place almost exclusively from the wire portion. In the absence of the large diameter tube, the discharge would radiate equally in all directions from the wire, but the presence of the charge on the tube causes the discharge from the wire to be repelled away from the tube and toward the rotating electrode. The discharge is said to be beamed toward or focused on the grounded electrode. The electric field established between the ionizing electrodes and the grounded rotating drum also causes the ions to flow toward the grounded electrode. Waste material particles on the drum are thus subjected to intensive ion bombardment, and a surface charge is applied to all of the waste material particles. The use of negatively charged ionizing electrodes results in the application of a negative charge to the waste particles.

The surface charge applied to highly conductive particles, such as copper, aluminum or other non-ferrous metals, rapidly dissipates by conduction through the particle to the grounded roll. The charge applied to glass particles tends to persist because of the highly dielectric nature of the glass. The surface charge applied to particles of materials having conductivity intermediate that of the non-ferrous metals and that of glass, e.g., stones, brick fragments, porcelain, bone, or wet wood, also tends to dissipate but at a slower rate than the charge applied to the non-ferrous metals. The charge on the glass particles and the electric field between the ionizing electrodes and the rotating electrode interact to pin the glass particles to the rotating drum. Viewing the drum from one end and assuming the drum is rotating in a clockwise direction, the zone of ion bombardment extends from about 12 o'clock to about 3 o'clock around the periphery of the roll.

The waste material travelling around the periphery of the rotating roll leaves the first zone or ion bombardment zone and enters a second zone wherein it is subjected to an electrostatic field. A larger diameter tube having no sharp corners or tightly curved edges may be utilized as a non-discharging electrode to establish the strong electrostatic field between electrode and the rotating grounded drum. Preferably, the non-ionizing electrode is charged with a high D.C. potential of the same polarity and substantially equal in voltage to that applied to the ionizing electrodes in the previous zone. For special applications it may be desirable to apply a higher or lower voltage to the static electrode. Waste material particles entering the static electric field of the second zone have induced thereon a charge opposite in polarity to the polarity of the electrode. Use of a negative electrode results in the induction of a positive charge on the particles. For highly conductive particles such as the non-ferrous metals, the effect is rapid and strong. By conduction through the particles the induced charge quickly becomes equalized over the entire surface. The static electric field induces some polarization on the non-conductive glass particles which are still highly charged from the ion bombardment treatment, but because of the high dielectric property of the glass, the induced polarization effect cannot be equalized or uniformly distributed; the net charge on the glass particles resulting from the ion bombardment remains largely undissipated, and the glass remains pinned to the rotating grounded electrode by the combined effect of the surface charge and the static electric field.

Particles having conductivities intermediate that of the highly conductive ferrous metals and the non-conductive glass particles have induced thereon a polarization charge opposite in polarity to that of the non-ionizing electrode in a manner similar to the induction of a charge on the non-ferrous metal particles except that the effect is not so rapid due to the lesser conductivity of the particles.

Just as negatively charged glass particles are repelled from a negative non-ionizing electrode and thus are pinned against the rotating drum, relatively more conductive particles which have a positive charge induced thereon by a negative non-ionizing electrode are attracted to that electrode and are drawn away from the rotating drum. Due to the combined effect of the momentum which they assume while travelling around the periphery of the drum and the centrifugal force and attractive force to the non-ionizing electrode coupled with the influence of gravity, the relatively conductive particles with induced positive charges are not attracted directly to the negative non-ionizing electrode but assume a trajectory which takes them to a collecting bin or chute. The second or electrostatic zone occupies a region from about 3 o'clock to about 5 o'clock viewing the roll as before.

The end of the second or electrostatic treatment zone is established by a splitter positioned at or near the end of the effective electrostatic field between the non-ionizing electrode and the rotating grounded drum. The splitter is positioned a short distance from the rotating roll, preferably in a range from about 1½ inches to about 3 inches. Glass particles which largely retain the negative charge applied to them by the ion bombardment in the first treatment zone, remain pinned to the rotating drum by the electrostatic field established between the negative non-ionizing electrode and the roll, and thus continue to travel with the roll surface past the splitter.

Waste material particles of relatively higher conductivity which have lost the negative charge applied by the iron bombardment in the first zone through conduction to the grounded roll and which have had induced thereon a net positive charge due to repulsion of electrons by the negatively charged non-ionizing electrode in the second zone; the repelled electrons being conducted from the conductive particles to the rotating roll and from thence to ground, are drawn away from the roll by the electrostatic field established between the negatively charged non-ionizing electrode and the grounded roll.

The thusly attracted relatively conductive particles are cut off by the splitter and are prevented from continuing with the pinned glass particles. Generally, highly conductive particles such as non-ferrous metals have induced thereon a comparatively higher positive charge and thus are strongly influenced by the electrostatic field and assume a free trajectory into the tailings collecting bin or chute. Particles of somewhat lesser conductivity such as brick chips and wet wood have induced thereon a positive charge of somewhat lesser magnitude and thus are less strongly influenced by the electrostatic field. These particles may impinge against the splitter from which they are deflected into the tailings bin. It is contemplated within the scope of the invention that the spacing between the splitter and the rotating roll may be variable to allow adjustments in order to achieve optimum separations under varying operating conditions.

Upon passing the splitter, the glass particles enter a third zone wherein they are not subjected to the influence of an effective electrostatic field. In the absence of an effective field, the charged particles are no longer pinned to the grounded roll and fall under the influence of gravity into a glass product collecting bin or chute. Any particles which still adhere to the rotating roll electrode may be readily released by use of an optional rotating brush.

Inasmuch as some materials such as dry paper may also be good non-conductors and may be difficult to separate from the glass in the electrostatic separation, removal low bulk density materials in the air classification step should be undertaken where a significant fraction of such materials exists in the feed waste.

Efficiency of operation of the electrostatic separator may be enhanced by reducing the moisture content of the feed material to less than about 1%. Excessive surface moisture on the glass particles may cause the charge applied to the particles during the ion bombardment to be dissipated by conduction through the water to the grounded rotating electrode so that effective pinning of the glass to the rotating electrode in the electrostatic zone will not take place and a portion of the glass will turn up in the tailings fraction.

Where the moisture content of the feed material is less than about 2%, the separation may be carried out at ambient temperatures in the range from about 15° C. to about 30° C.

Figure 2:
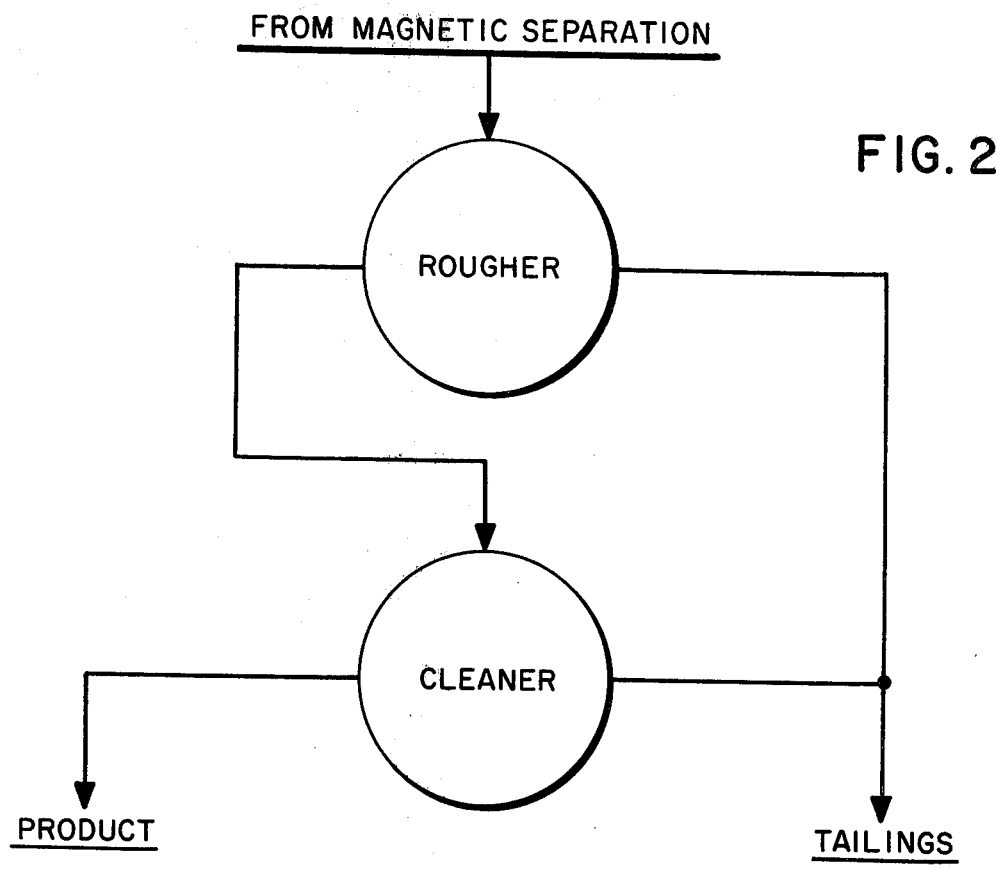
FIG. 2 is a flow chart representation of a modification of the preferred process involving two stage electrostatic separation.

FIG. 2 is a flow chart illustrating a further refinement of the invention. The initial steps of the process are identical to those discussed in conjunction with the embodiment of FIG. 1. In the embodiment of FIG. 2 the waste material is subjected to two successive electrostatic separating stages. The first stage is a rougher stage which effects a preliminary separation removing most of the conductive particles from the glass. The second stage is a cleaner stage which removes the remainder of the non-glass particles from the glass fraction. It is contemplated that both the rougher and cleaner treatment stages will correspond to the separator illustrated schematically in and discussed in conjunction with FIG. 1. Accordingly, detailed illustration and discussion of the arrangement of the apparatus will not be repeated here. The operating parameters of the rougher stage may correspond substantially to those of the separation stage illustrated in and discussed in conjunction with FIG. 1. The splitter spacing of the cleaner stage should be in the range from 1¼ to 2¼ inches. The roll speed of the cleaner stage may be somewhat less than the speed of the rougher roll electrode. Likewise, the D.C. potential applied to the non-ionizing static electrode in the cleaner stage may be somewhat greater than the potential applied in the rougher stage. The rougher stage comprises three treatment zones corresponding to the three zones illustrated in and discussed in conjunction with the separator of FIG. 1. The cleaner stage comprises a fourth, fifth and sixth zone which correspond substantially to the first, second and third zones respectively. In the embodiment of FIG. 2 the glass fraction isolated from the rougher roll is fed to a second vibratory feeder from which it cascades onto the cleaner stage grounded roll and passes successively through a fourth treatment zone wherein it is subjected to ion bombardment, a fifth treatment zone wherein it is subjected to the influence of an electrostatic field and a sixth zone in which a clean glass fraction is collected.

Figure 3:
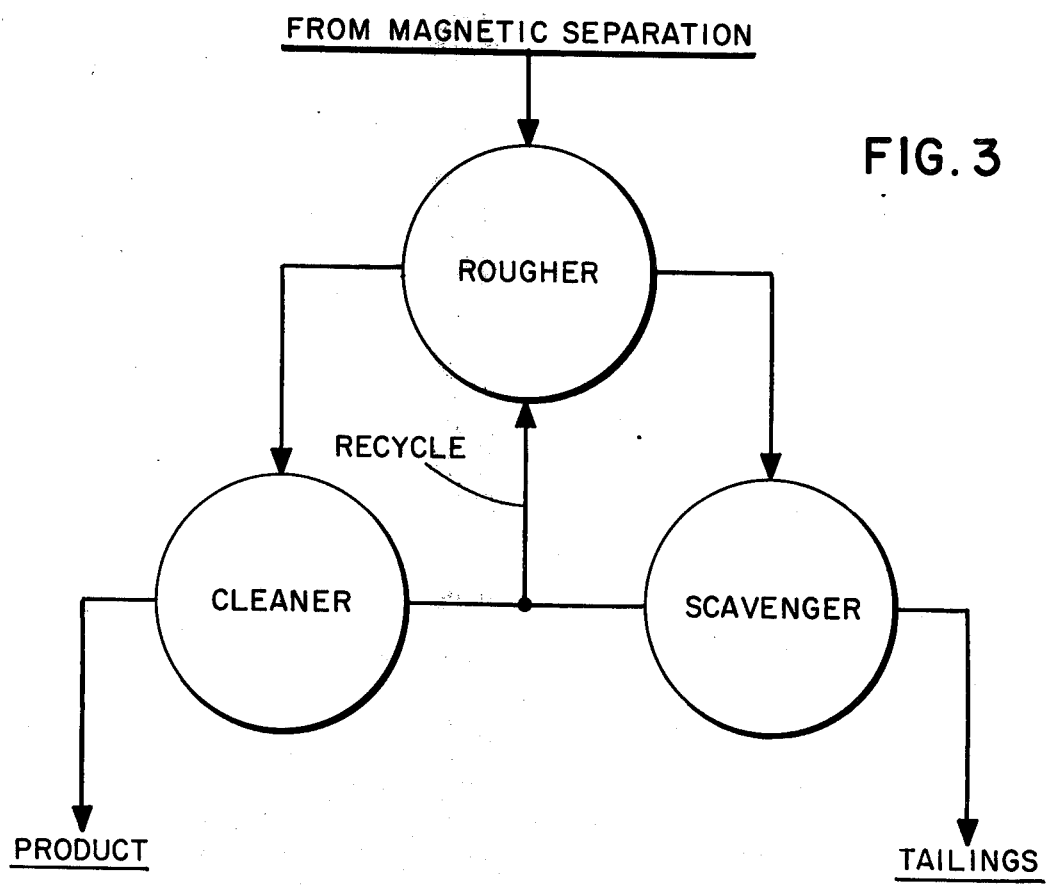
FIG. 3 is a flow chart representation of a further modification of the preferred process wherein three stage electrostatic separation is effected.

FIG. 3 is a flow chart representation of a second modification of the invention in which the waste material is subjected to three electrostatic separation stages, a rougher stage, a cleaner stage, and a scavenger stage. The physical apparatus needed for each of the three stages again corresponds substantially to the physical apparatus illustrated schematically in and discussed in conjunction with the electrostatic separation stage of FIG. 1. The rougher stage provides three treatment zones which correspond to the first, second and third zones of the embodiment of FIG. 1; the cleaner stage provides fourth, fifth and sixth treatment zones which, as in the embodiment of FIG. 2, correspond to the first, second and third zones respectively; and the scavenger stage provides seventh, eighth and ninth treatment zones which again correspond to the first, second and third zones respectively. The tailings fraction from the rougher zone is transferred to a vibratory feeder from which it cascades onto the top of the rotating conductive electrode in the scavenger stage whereon it is subjected to ion bombardment in the seventh zone; to the influence of an electrostatic field in the eighth zone, and wherein residual glass containing non-conductive material is collected in a ninth zone. The residual conductive fraction from the fifth treatment zone in the cleaner stage and the residual non-conductive fraction from the ninth zone in the scavenger stage are recycled to the feed material entering the rougher stage. Operating parameters of the rougher and cleaner stages are as discussed in conjunction with FIGS. 1 and 2. The splitter spacing of the scavenger stage is somewhat increased; preferably lying in the range from about 2 to about 4 inches. The D.C. potential applied to the corona discharge electrodes in the seventh treatment zone may be somewhat greater than the potential applied to corresponding electrodes in the first zone of the rougher stage. As in the cleaner stage, the roll speed of the scavenger roll may be somewhat less than the speed of the rougher roll.

Under most circumstances the use of a single electrostatic separation stage should be satisfactory. However, multi-stage separation may be desirable (1) when the range of particle sizes is particularly large, (2) when the average particle size is quite small so that the waste material has an undesirable surface area to mass ratio, (3) when the feed material contains an usually large percentage of wet wood or other relatively low coductivity conductive particles, or (4) when the presence of even relatively minor amounts of other substances in the recovered glass is detrimental to its planned use.

Dust and other exceptionally fine particles may have a tendency to foul the electrodes or to disrupt the static fields in the second, fifth and eighth treatment zones. Removal of all particles less than about ⅛ inch in size in either the sizing or the air classification steps should obviate any such problems.

The importance of the surface area to mass ratio should be noted. The force pinning the glass particles to the rotating conductive electrode varies directly with the amount of charge applied to the particles during ion bombardment which in turn depends on the surface area of the particles. The forces opposed to the pinning force include significant contributions from the centrifugal force due to the rotation of the roll and the force of gravity, both of which vary directly with the mass of the particles. For effective separation, the pinning force must exceed the opposing forces. Thus it can generally be said that the higher the average surface area to mass ratio, the more efficient the separation will be at comparable roll speeds and electrode potentials.

While the use of single ionizing electrode in the ion bombardment zone may be enough to charge the glass particle surfaces sufficiently to effect pinning of the particles in the static zone, I prefer to use three such electrodes in order to assure that sufficient charge will be applied to all of the particles to achieve effective pinning in the electrostatic zone and the most efficient final separation.

EXAMPLE

The efficiency of the invention is illustrated by the following example in which a synthetic waste material comprising 70% glass, 5% metal, principally aluminum but including trace amounts of other metals, 20% stones, 4% ceramics and 1% other material was subjected to two stage separation according to the scheme illustrated in FIG. 2. Three D.C. corona discharge electrodes were used in the ion bombardment zone of each separation stage. The size range of the simulated waste ranged up to 1 inch. The glass product fraction comprised 68% by weight of the feed material and was composed of 99.9% glass. This constituted a recovery of 97% of the glass in the feed material.

The foregoing embodiments have been described merely to illustrate the invention and not by way of limitation. Since modifications of the invention may occur to those skilled in the art, the scope of the invention is to be limited solely by the scope of the appended claims.

I claim:
1. A method of separating glass particles from waste material comprising the steps of:
    (a) sizing the waste material to a particle size greater than ⅛ inch and less than 1½ inches;
    (b) subjecting the waste material to preliminary classification to remove low bulk density material and reducing the moisture content of the waste material to less than 2%;
    (c) pinning the glass particles to a grounded electrode comprising a metal drum having a diameter between about 14 and about 36 inches rotating at a rate lying in a range from about 8 to about 25 rpm by feeding the waste material in contact with said grounded electrode at a rate between 50 and 150 pounds per hour per inch of grounded electrode length through a first zone wherein the waste material is subjected to ion bombardment from at least one ionizing D.C. corona discharge electrode;
    (d) removing non-glass particles by passing the waste material in contact with said grounded metal electrode into a second zone wherein the waste material is subjected to an electrostatic field from a non-ionizing electrode; and
    (e) releasing and collecting the glass particles from said grounded electrode in a third zone.

2. A method as recited in claim 1 further comprising the step of subjecting the waste material to magnetic separation to remove ferrous metal particles prior to the step of pinning the glass particles to said grounded electrode.

3. A method as recited in claim 1 wherein said preliminary classification is effected by air classification.

4. A method as recited in claim 1 wherein said corona discharge electrodes are focusing electrodes.

5. A method as recited in claim 4 wherein said focusing corona discharge electrodes are spaced from the grounded rotating drum electrode a distance lying in the range from 2 to 4 inches.

6. A method as recited in claim 5 wherein the voltage applied to said corona discharge electrodes lies in the range from 20 kilovolts to 40 kilovolts.

7. A method as recited in claim 6 wherein said corona discharge electrodes are energized by negative polarity D.C. potential in the range of 25 to 35 kilovolts.

8. A method as recited in claim 6 wherein the number of corona discharge electrodes in the first zone is 3.

9. A method as recited in claim 6 wherein said corona discharge electrodes are energized by positive polarity D.C. potential in the range of 25 to 35 kilovolts.

10. A method as recited in claim 1 wherein the feed rate lies between 80 pounds per hour per inch of grounded electrode length and 110 pounds per hour per inch.

11. A method as recited in claim 1 wherein the line of demarcation between the second and third zone is established by a splitter spaced a distance in the range of from 1½ inches to 3 inches from the grounded rotating electrode.

12. A method as recited in claim 1 wherein the particle size of the waste material fed to the grounded electrode is in the range of ⅛ inch to 1⅛ inches.

13. A method as recited in claim 1 wherein the moisture content of the waste material is reduced to less than 1%.

14. A method as recited in claim 1 wherein the collected glass particles contain residual non-glass particles further comprising the additional steps of:
passing the collected particles from said third zone to a fourth zone in contact with a second grounded electrode wherein the collected particles are subjected to ion bombardment from at least one ionizing electrode whereby the glass particles are pinned to the second electrode;
collecting the residual non-glass particles by passing the particles from said fourth zone in contact with said second grounded electrode to a fifth zone wherein the particles are subjected to an electrostatic field from a non-ionizing electrode; and
releasing and collecting the glass particles from said second grounded electrode in a sixth zone.

15. A method as recited in claim 14 wherein the collected non-glass particles from zone 2 contain residual glass particles further comprising the additional steps of:
passing the collected particles from said second zone to a seventh zone in contact with a third grounded electrode wherein the collected particles are subjected to ion bombardment from at least one ionizing electrode whereby the residual glass particles are pinned to said third grounded electrode;
collecting the non-glass particles by passing the particles from said seventh zone in contact with said third grounded electrode to an eighth zone wherein the particles are subjected to an electrostatic field from a non-ionizing electrode;
releasing and collecting the residual glass particles from said third grounded electrode in a ninth zone; and
recycling the residual non-glass particles from said fifth zone and the residual glass particles from said ninth zone to the feed material entering the first treatment zone.

16. A method as recited in claim 15 wherein the ionizing and non-ionizing electrodes in the first, second, fourth, fifth, seventh and eighth zones are all negative polarity D.C. electrodes.

* * * * *